(12) United States Patent
Rohde et al.

(10) Patent No.: US 8,443,342 B2
(45) Date of Patent: May 14, 2013

(54) STATIC ANALYSIS USING INTERACTIVE AND INTEGRATION TOOLS

(75) Inventors: Henning Korsholm Rohde, Renton, WA (US); Anna Gringauze, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 334 days.

(21) Appl. No.: 12/791,421

(22) Filed: Jun. 1, 2010

(65) Prior Publication Data

US 2011/0296388 A1 Dec. 1, 2011

(51) Int. Cl.
*G06F 9/44* (2006.01)

(52) U.S. Cl.
USPC .............................. 717/131; 717/125; 717/128

(58) Field of Classification Search .................. 717/124, 717/131, 141–144, 146, 154
See application file for complete search history.

(56) References Cited

U.S. PATENT DOCUMENTS

| | | | |
|---|---|---|---|
| 5,187,789 A * | 2/1993 | O'Hair ................................. | 1/1 |
| 6,996,806 B2 | 2/2006 | Bates | |
| 7,089,542 B2 * | 8/2006 | Brand et al. .................. | 717/143 |
| 7,174,536 B1 | 2/2007 | Kothari et al. | |
| 7,219,341 B2 | 5/2007 | Dalton et al. | |
| 7,530,054 B2 | 5/2009 | Reimer et al. | |
| 7,774,760 B2 * | 8/2010 | Mishra et al. ................. | 717/128 |
| 2002/0007483 A1 * | 1/2002 | Lopez ............................. | 717/3 |
| 2002/0062463 A1 | 5/2002 | Hines | |
| 2007/0256054 A1 * | 11/2007 | Byrne et al. .................. | 717/113 |
| 2007/0288899 A1 | 12/2007 | Fanning et al. | |
| 2008/0098349 A1 * | 4/2008 | Lin et al. ....................... | 717/106 |
| 2008/0276228 A1 * | 11/2008 | Sreedhar ....................... | 717/131 |
| 2008/0320458 A1 * | 12/2008 | Aronson et al. .............. | 717/154 |
| 2010/0017788 A1 * | 1/2010 | Bronkhorst et al. .......... | 717/125 |
| 2011/0126288 A1 * | 5/2011 | Schloegel et al. ............ | 726/25 |

FOREIGN PATENT DOCUMENTS

| KR | 1019990042696 A | 6/1999 |
|---|---|---|
| KR | 1020060113168 A | 11/2006 |

OTHER PUBLICATIONS

Phang et al, Path Projection for User-Centered Static Analysis Tools, 2008, Proceedings of the 8th ACM SIGPLAN-SIGSOFT workshop on Program analysis for software tools and engineering, pp. 57-63.*
Beyer et al., "Path Invariants", 2007, ACM 978-1-59593-633-2/07/2006, PLDI '07 Jun. 11-13, 2007, San Diego, California, USA.*
Xie et al., "SATURN: A Scalable Framework for Error Detection Using Boolean Satisfiability", May 2007, ACM 0164-0925/2007/05-ART16, ACMTransactions on Programming Languages and Systems,vol. 29, No. 3,Article 16.*
International Search Report, mailed Jan. 2, 2012, in U.S. Appl. No. 12/791,421, 3 pp.

(Continued)

*Primary Examiner* — Thuy Dao
*Assistant Examiner* — Stephen Berman
(74) *Attorney, Agent, or Firm* — Shook, Hardy & Bacon LLP

(57) ABSTRACT

Systems, methods, and computer storage media having computer-executable instructions embodied thereon that facilitate static software program analysis using an interactive tool and/or a disassembly integration tool are provided. An interactive tool enables a user to view alternative error paths in association with an error such that the user can identify any valid errors within program code. A disassembly integration tool provides source code that is interleaved with an intermediate representation of such source code.

15 Claims, 11 Drawing Sheets

OTHER PUBLICATIONS

"Parasoft C++Test:C/C++Testing, Static Analysis, Code Review," published Mar. 15, 2010, http://www.parasoft.com/jsp/products/cpptest.jsp, 1 pp.

Chapman et al., "Dragon: An Open64-Based Interactive Program Analysis Tool for Large Applications," published Aug. 27, 2003, IEEE, pp. 792-796.

Abram et al., "An Extended Data-Flow Architecture for Data Analysis and Visualization," Retrieved Apr. 1, 2010, http://www.research.ibm.com/dx/proceedings/dx_paper/, 15 pp.

Paul V. Gestwicki, "Interactive Visualization of Object-Oriented Programs," Jun. 15, 2005, Retrieved Apr. 1, 2010, http://www.cse.buffalo.edu/pub/WWW/LRG/Research/jive-dissertation.pdf, 259 pp.

"SolidFX—The fastest framework for static analysis of C/C++programs," retrieved Apr. 1, 2010, http://www.solidsourceit.com/products/SolidFX-static-code-analysis.html, 4 pp.

"Measure Your Software Quality to Identify Risk," Retrieved Apr. 1, 2010, http://www.mccabe.com/iq_developers.html, 5 pp.

\* cited by examiner

| MICROSOFT.ANVIL.VIEWER – TEST.CS | | | | | | — ☐ × |
|---|---|---|---|---|---|---|
| FILE EDIT FILTER | | | | | | |
| OVERVIEW | | | | | | |
| NO | MODULE | TOOL | ID | MESSAGE | SEVERITY | RANK |
| 1 | | RDUSAGE.FORMATSTRING | 27111 | FUNCTION '[TEST]HELLOWORLD::PRINTARGUMENT' USES A FORMAT STRING WITH 3 PARAMETERS, BUT ONLY 2 ARE PASSED | ERROR | HIGH |
| 2 | | RDUSAGE.FORMATSTRING | 27111 | FUNCTION '[TEST]HELLOWORLD::PRINTARGUMENT' USES A FORMAT STRING WITH 3 PARAMETERS, BUT ONLY 2 ARE PASSED | ERROR | HIGH |
| DONE | | | | FILTERED: SUPPRESSED DEAD 'EVAL' 2 DIAGNOSTICS | | |

400

402 { rows 1–2 }

404 (row 2 highlighted)

FIG. 4

```
MICROSOFT.ANVIL.VIEWER – TEST.CS                                    [_][□][x]
FILE  EDIT  FILTER
[OVERVIEW] [2:27111]
        TEST.CS
     1  using System;
     2  using System.Text;
     3
     4  public class HelloWorld
     5  {
     6    public static void Main(string[] args)
     7    {
     8      int i = 0;
     9      int count = args.Length;
    10
    11      foreach (var arg in args)
    12      {
    13        // the tool doesn't know the number of arguments during the analysis
    14        if (count < 3)
    15        {
    16          DoAlotOfWork();
    17        }
    18        else
    19        {
    20          DoLessWork();
    21        }
    22
    23        PrintArgument("Argument number", arg);
    24        i++;
    25      }
    26    }
    27
    28    private static void PrintArgument(string text, params string[] args)
    29    {
    30      // the shortest path has count > 3 which might be not feasible.  We want the user
    31
    32      Console.WriteLine("{0} {1}: {2}", text, args); // runtime error: insufficient number of
    33    }
    34
    35    private static void DoAlotOfWork()
    36    {
    37      // long trace
    38
    39      Console.WriteLine("a");
    40      Console.WriteLine("a");
    41      Console.WriteLine("a");
    42      Console.WriteLine("a");
    43      Console.WriteLine("a");
    44      Console.WriteLine("a");
    45      Console.WriteLine("a");
    46      Console.WriteLine("a");
    47      Console.WriteLine("a");
    48    }
    49

[SUMMARY] [SIMULATION STATE]          [CALL STACK]
                                      [  NAME          LANGUAGE  ]
[DONE]                          [FILTERED: SUPPRESSED DEAD 'EVAL' | 2 DIAGNOSTICS]
```

FIG. 5

```
MICROSOFT.ANVIL.VIEWER – TEST.CS                                    [_][□][x]
FILE  EDIT  FILTER
[OVERVIEW] 2:27111
        TEST.CS
    1   using System;
    2   using System.Text;
    3
    4   public class HelloWorld
    5   {
    6     public static void Main(string[] args)
    7     {
    8       int i = 0;
    9       int count = args.Length;
   10
   11       foreach (var arg in args)
   12       {
   13         // the tool doesn't know the number of arguments during the analysis
   14         if (count < 3)
   15         {
   16           DoAlotOfWork();
   17         }
   18         else
   19         {                              ⌐602
   20           DoLessWork();
   21         }
   22
   23         PrintArgument("Argument number", arg);
   24         i++;
   25       }
   26     }
   27
   28     private static void PrintArgument(string text, params string[] args)
   29     {
   30       // the shortest path has count > 3 which might be not feasible.  We want the user to be ab
   31
   32       Console.WriteLine("{0} {1}: {2}", text, args); // runtime error: insufficient number of argume
   33     }
   34
   35     private static void DoAlotOfWork()
   36     {
   37       // long trace
   38
   39       Console.WriteLine("a");
   40       Console.WriteLine("a");
   41       Console.WriteLine("a");
   42       Console.WriteLine("a");
   43       Console.WriteLine("a");
   44       Console.WriteLine("a");
   45       Console.WriteLine("a");
   46       Console.WriteLine("a");
   47       Console.WriteLine("a");
   48     }
   49
SUMMARY [SIMULATION STATE]              CALL STACK
[<][ ]              [>]                  NAME       LANGUAGE
DONE                                    FILTERED: SUPPRESSED DEAD 'EVAL' | 2 DIAGNOSTICS
```

FIG. 6

```
MICROSOFT.ANVIL.VIEWER – TEST.CS                                    _ ☐ ×
FILE  EDIT  FILTER
OVERVIEW │ 2:27111
         TEST.CS
     1   using System;
     2   using System.Text;
     3
     4   public class HelloWorld
     5   {
     6     public static void Main(string[] args)
     7     {
     8       int i = 0;
     9       int count = args.Length;
    10
    11       foreach (var arg in args)
    12       {
    13         // the tool doesn't know the number of arguments during the analysis
    14         if (count < 3)
    15         {
    16           DoAlotOfWork();
    17         }
    18         else
    19         {
    20           DoLessWork();
    21         }
    22
    23         PrintArgument("Argument number", arg);
    24         i++;
    25       }
    26     }
    27
    28     private static void PrintArgument(string text, params string[] args)
    29     {
    30       // the shortest path has count > 3 which might be not feasible.  We want the user t
    31
    32       Console.WriteLine("{0} {1}: {2}", text, args); // runtime error: insufficient number of
    33     }
    34
    35     private static void DoAlotOfWork()
    36     {
    37       // long trace
    38
    39       Console.WriteLine("a");
    40       Console.WriteLine("a");
    41       Console.WriteLine("a");
    42       Console.WriteLine("a");
    43       Console.WriteLine("a");
    44       Console.WriteLine("a");
    45       Console.WriteLine("a");
    46       Console.WriteLine("a");
    47       Console.WriteLine("a");
    48     }
    49
SUMMARY │ SIMULATION STATE │          │ CALL STACK │
                                        NAME            LANGUAGE
DONE                        FILTERED: SUPPRESSED DEAD 'EVAL' │ 2 DIAGNOSTICS
```

| MICROSOFT.ANVIL.VIEWER – TEST.CS | | | | | | – □ × |
|---|---|---|---|---|---|---|
| FILE EDIT FILTER | | | | | | |
| OVERVIEW | | | | | | |
| NO | MODULE | TOOL | ID | MESSAGE | SEVERITY | RANK |
| 1 | | RDUSAGE::FORMATSTRING | 27111 | FUNCTION '[TEST]HELLOWORLD::PRINTARGUMENT USES A FORMAT STRING WITH 3 PARAMETERS, BUT ONLY 2 ARE PASSED | ERROR | HIGH |
| 2 | | RDUSAGE::FORMATSTRING | 27111 | FUNCTION '[TEST]HELLOWORLD::PRINTARGUMENT USES A FORMAT STRING WITH 3 PARAMETERS, BUT ONLY 2 ARE PASSED | ERROR | HIGH |
| DONE | | | | FILTERED: SUPPRESSED DEAD 'EVAL' 2 DIAGNOSTICS | | |

MICROSOFT.ANVIL.VIEWER – TEST.CS

FILE  EDIT  FILTER

OVERVIEW  2:27111

TEST.CS

```
1   using System;
2   using System.Text;
3
4   public class HelloWorld
5   {
6     public static void Main(string[] args)
7     {
8       string x = null;
9
10      // the intention is to print "null" when x is null and lower-case version of x when it is non-null
11      // in reality, this program crashes with null pointer dereference.
12      // It is very hard for humans to understand why the exception is thrown here while looking
13      // at the source but it is clear what is wrong in the disassembly mode
14
15      Console.WriteLine("the x is " + x == null ? "null" : x.ToLower());
16    }
17  }
```

SUMMARY | SIMULATION STATE

INVOKING METHOD THROUGH NULL POINTER [TEST]HELLOWORLD::MAIN::X' (EXPRESSION 'X')

PATH SUMMARY

[X=NULL] ON CALL, VALUE ORIGIN 'X' AT    T281 = CALL [MSCORLIB]SYSTEM.STRING::CONCAT "THE X
[X=NULL] ERROR, VALUE ORIGIN 'X' AT    T284 = CALLVIRT [MSCORLIB]SYSTEM.STRING::TOLOWER X

CALL STACK

NAME | LANGUAGE
---|---
[TEST]HELLOWORLD::MAIN | MSIL

DONE

FILTERED: SUPPRESSED DEAD 'EVAL'  2 DIAGNOSTICS

```
┌─────────────────────────────────────────────────────────────────────────┐
│ MICROSOFT.ANVIL.VIEWER – TEST.CS                              _ □ x    │
│ FILE  EDIT  FILTER                                                      │
│ ┌OVERVIEW┐ 2:27111                                                     │
│ │        TEST.CS                                                        │
│        1   using System;
│        2   using System.Text;
│ 1102   3
│        4   public class HelloWorld
│        5   {
│        6     public static void Main(string[] args)
│            FUNCTION [Test]HelloWorld::Main
│ 1104                       = ENTER args
│                    x =?DECLARE null
│        7   {
│        8      string x = null;
│                    x = ASSIGN null
│        9
│        10  // The intention is to print "null" when x is null and lower-case version of x when
│ 1106   11  // it is non-null. In reality, this program crashes with null pointer dereference. It
│        12  // is very hard for humans to understand why the exception is thrown here while
│        13  // looking at the source but it is clear what is wrong in the disassembly mode.
│        14
│        15     Console.WriteLine("the x is " + x == null ? "null" : x.ToLower());
│                    t281 = CALL [mscorlib]System.String::Concat "the x is " x $L3(EH)
│                    t288 =?NE t281 0
│                          = BRANCH t288 true:$L10 false:$L14
│            $L10      = LABEL (references: 1)
│                    t284- =CALLVIRT [mscorlib]System.String::ToLower x $L3(EH)
│ 1108                     = GOTO $L20
│            $L14      = LABEL (references: 2)
│                    t284- =?ASSIGN "null"
│            $L20      = LABEL (references: 1)
│                          = CALL [mscorlib]System.Console::WriteLine t284- $L3(EH)
│        16  }
│                          = RETURN
│            $L2       = EXIT (references: 0)
│            $L3       = UNWIND (references: 3)
│        17  }
│ ┌SUMMARY┐ SIMULATION STATE      │ ┌CALL STACK┐
│ │INVOKING METHOD THROUGH NULL POINTER '[TEST]HELLO│   NAME         |LANGUAGE
│ │                                                 │[TEST]HELLOWORLD::MAIN  MSIL
│ │PATH SUMMARY                                     │
│ │[X=NULL] ON CALL, VALUE ORIGIN 'X' AT  T281 = CALL [MSC
│ │[X=NULL] ERROR, VALUE ORIGIN 'X' AT    T284 = CALLVIRT [M
│ │ <  III                                    >    │
│ DONE                    │ FILTERED: SUPPRESSED DEAD 'EVAL' │ 1 DIAGNOSTICS
└─────────────────────────────────────────────────────────────────────────┘
```

FIG.11

STATIC ANALYSIS USING INTERACTIVE AND INTEGRATION TOOLS

BACKGROUND

Static analysis is utilized in an effort to achieve high-quality software. Static analysis of a software program, or a portion thereof, generally refers to analyzing or inspecting program code without executing the code. Program code (e.g., source code) in association with a software program can be difficult for a user to analyze due to obscure information, complex expressions, complex macros, compiler-generated code, or the like. Accordingly, performing static analysis of such code can be inaccurate and time-consuming.

Further, errors within program code are oftentimes undetected during static analysis resulting in diminished quality of software. In particular, multiple simulation paths within the code can lead to a particular error of the program code. For example, a conditional branch or statement is a point in a computer program at which the flow of control is altered (e.g., an if-then statement) and thereby results in multiple paths that can each lead to a particular error. A viewer used in association with static analysis, however, generally only displays a single path in association with the error. In cases that the displayed error is deemed infeasible, or too unlikely, by the user in view of the displayed path, the user can reject or dismiss the error as noise (e.g., a noise error, a false positive, a bogus warning, etc.). In such cases, the user may be unaware that an alternative feasible path(s) in association with a valid error may exist. Failure to recognize valid errors within program code diminishes quality of the software and thereby results in unsatisfied software users.

SUMMARY

Embodiments of the present invention relate to systems, methods, and computer-readable media for, among other things, facilitating static software program analysis using an interactive tool and/or a disassembly integration tool. In this regard, embodiments of the present invention facilitate static software program analysis to enable a user to view alternative paths having an error and to view source code integrated with an intermediate representation thereof. Accordingly, an interactive tool allows a user to view alternative paths in association with an error such that the user can identify any valid errors within program code. Alternatively or additionally, a disassembly integration tool provides source code that is interleaved with an intermediate representation of such source code. Such an integrated display of source code and intermediate representation in association therewith enables a user to more easily understand and analyze the code.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 4 is an exemplary graphical user interface for displaying error identifiers, in accordance with an embodiment of the present invention;

FIG. 5 is an exemplary graphical user interface for displaying an initial error path, in accordance with an embodiment of the present invention;

FIG. 6 is an exemplary graphical user interface for displaying an option for providing an indication to view an alternative error path, in accordance with an embodiment of the present invention;

FIG. 7 is an exemplary graphical user interface for displaying an alternative error path, in accordance with an embodiment of the present invention;

FIG. 8 is an exemplary graphical user interface for displaying an indication of a dismissed error, in accordance with an embodiment of the present invention;

FIG. 10 is an exemplary graphical user interface for displaying source code, in accordance with an embodiment of the present invention; and FIG. 11 is an exemplary graphical user interface for displaying source code integrated with corresponding intermediate representations, in accordance with an embodiment of the present invention.

DETAILED DESCRIPTION

Figure 1:
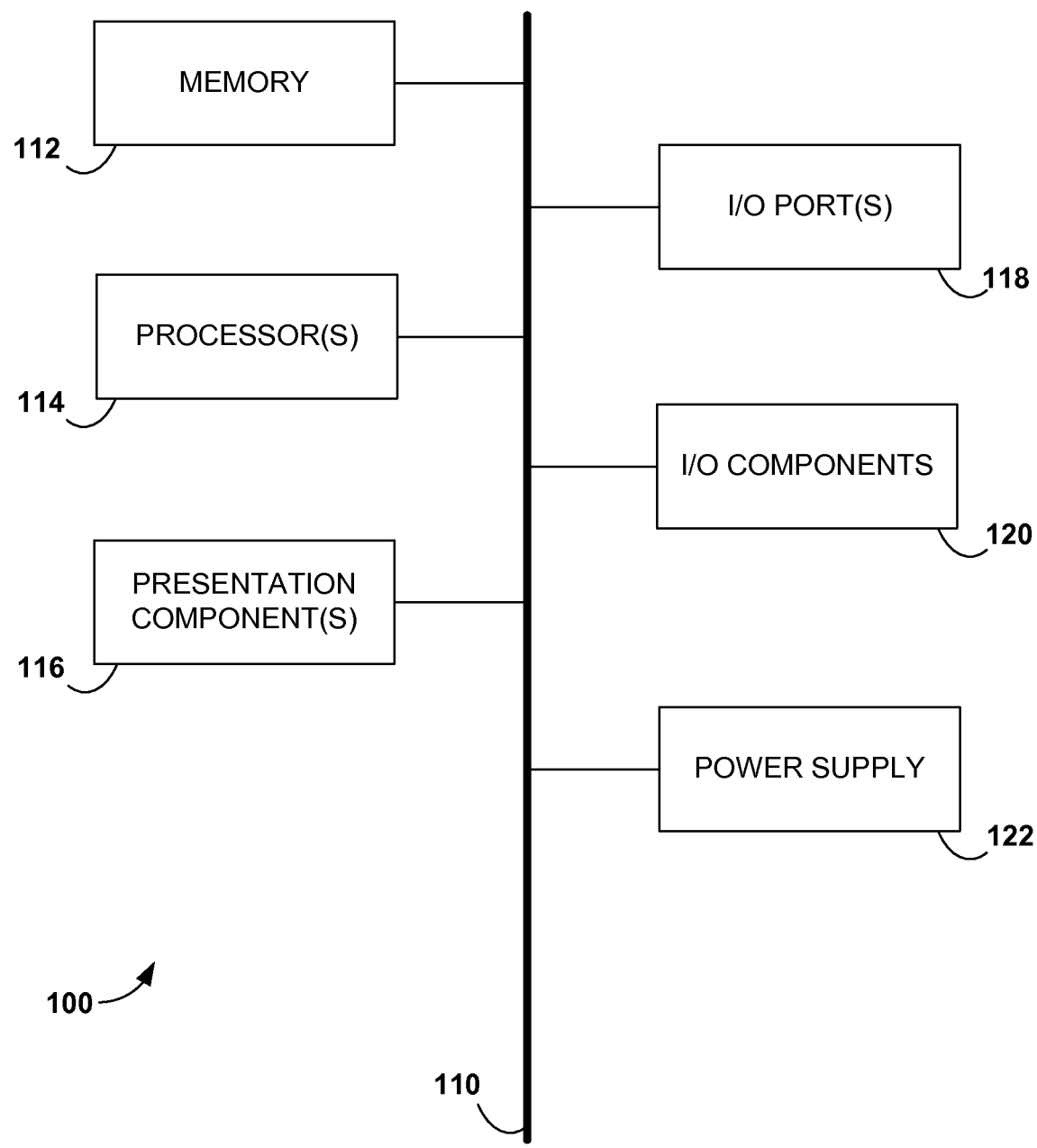
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems, methods, and computer storage media having computer-executable instructions embodied thereon that facilitate static analysis of a software program, or a portion thereof, via an interactive tool and/or a disassembly integration tool. Static analysis of a software program generally refers to analyzing a software program, or a portion thereof, by inspecting program code (e.g., source code) of the software program. In this regard, static analysis is performed without running or executing the software program or a portion thereof. By contrast, dynamic analysis of a software program refers to running or executing a possibly instrumented software program, or a portion thereof, for example, using selected examples and monitoring the actual execution. "Program code" or "code" is generally used herein to refer to code of a software program in any format. Accordingly, in embodiments, the term "code" or the phrase "program code" are used herein to refer to a source code or an intermediate representation thereof, as discussed more fully below.

An interactive tool is a tool that enables a user to interact with a viewer to view alternative error paths. A path refers to a path of program code having a beginning point and ending point. In embodiments, a path can be a portion of a trace. A trace refers to an indication (e.g., graph, list, etc.) of one or more paths from a beginning point to an ending point. In this regard, a trace may be a graph or list of all paths from a beginning point to an ending point. In embodiments, a beginning point of a path or trace is the beginning or start of a function, such as a main program function. In other embodiments, a beginning point of a path or trace refers to any point in a program code, such as, for example, at the beginning of a conditional statement (e.g., an if/then statement), any instruction, etc. In one embodiment, an ending point of a path or trace is the end of a function or any instruction. In an alternative embodiment, an ending point of a path or trace coincides with an error detected within the path or trace and/or marked with an error point. An error trace, as used herein, refers to a trace that includes an error. Similarly, an error path refers to a path that includes an error. An error is an error or defect in the program code that prevents the software program to successfully or completely execute or function. As discussed more fully below, a user can select to view an alternative error path that is different or unique from an error path(s) presently and/or previously displayed to the user.

A disassembly integration tool is a tool that presents source code interleaved with the corresponding intermediate representation. Intermediate representation (IR), as used herein, refers to an intermediate representation of the program source code. In some embodiments, an IR is a machine and language independent version of corresponding original source code. Interleaving source code with corresponding intermediate representation enables a user to more easily view and understand the program code and any issues in association therewith. In this regard, the disassembly integration tool integrates intermediate representations with source code in appropriate or effective locations that enable a user to readily view and compare the forms of program code (i.e., source code and IR). In some cases, a user can switch back and forth between source code and IR and/or navigate at either level. For instance, a user might navigate at the source code level and switch to disassembly mode if a portion of the code is confusing or seems incorrect. Although the disassembly integration tool is discussed herein as interleaving source code with IR, other code, such as compiler-generated code, MSIL or machine code, can be interleaved with IR.

Accordingly, in one aspect, the present invention is directed to one or more computer storage media having computer-executable instructions embodied thereon, that when executed, cause a computing device to perform a method for facilitating static software program analysis that presents alternative error paths to users. The method includes presenting a first error path comprising a first path of a software program including an error. An indication to navigate to another error path of the software program including the same error is received. A second error path comprising a second path of a software program including the same error is presented.

In another aspect, the present invention is directed to a method for facilitating static software program analysis that presents source code interleaved with intermediate representations, the method comprising: referencing at least a portion of source code; referencing at least a portion of an intermediate representation in association with the source code; identifying a first section of the intermediate representation that corresponds with a first section of the source code; interleaving the source code with intermediate representation, wherein the first section of the intermediate representation is positioned relative to the first section of the source code; and displaying the at least the portion of source code with the first section of the intermediate representation interleaved within the at least the portion of the source code.

In yet another aspect, the present invention is directed to a system for facilitating static software program analysis. The system includes an interaction tool for displaying alternative error paths of a source code having an error. The alternative error paths are a different error path from a currently presented or previously presented error path. The system further includes a disassembly integration tool for integrating source code with an intermediate representation of the source code, wherein sections of the source code are interleaved with corresponding sections of the intermediate representation.

Having briefly described an overview of the present invention, an exemplary operating environment in which various aspects of the present invention may be implemented is described below in order to provide a general context for various aspects of the present invention. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
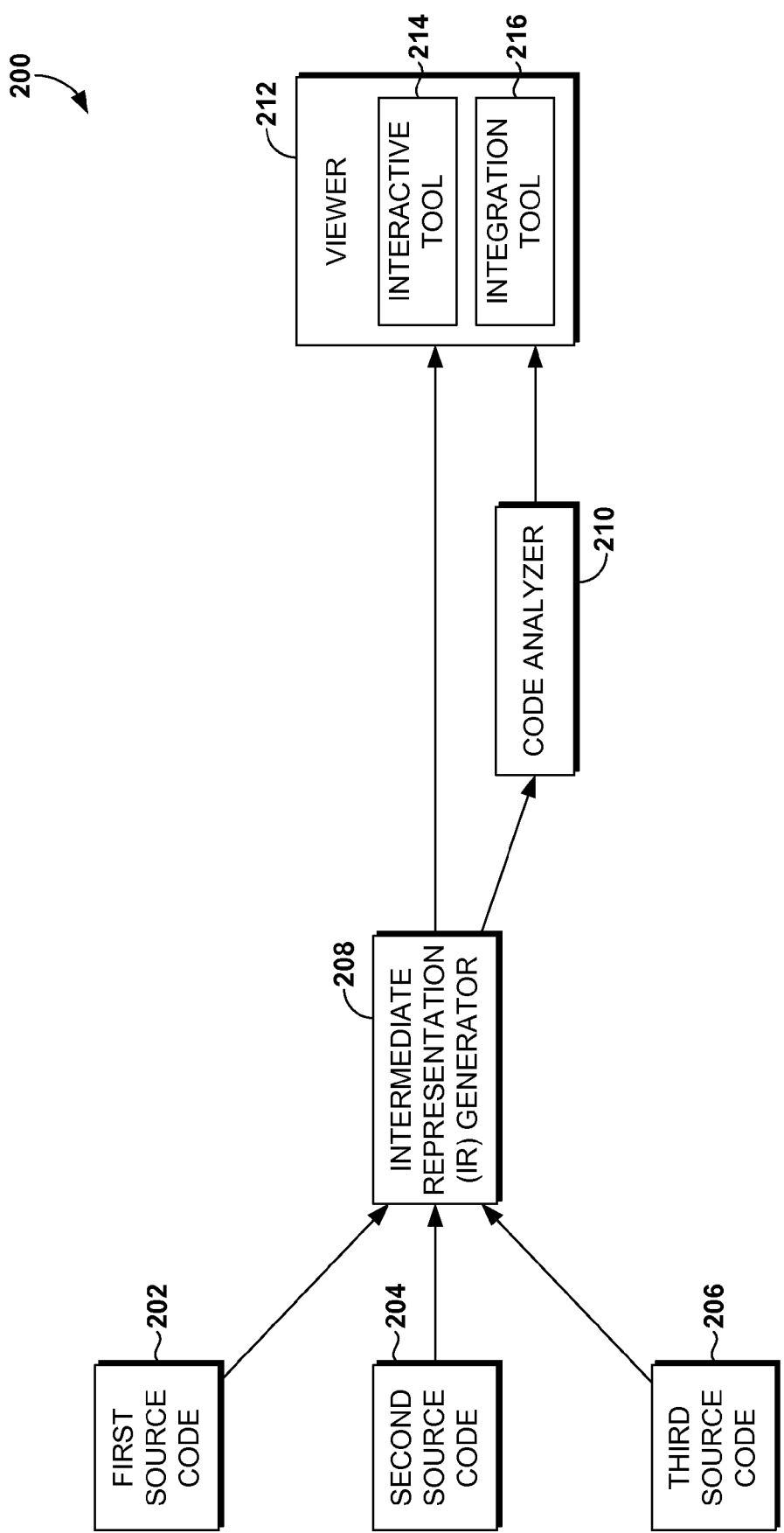
FIG. 2 is a block diagram of an exemplary computing system suitable for use in implementing embodiments of the present invention.

With reference to FIG. 2, a block diagram is illustrated that shows an exemplary computing system architecture 200 configured for use in implementing embodiments of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single module/component or combination of modules/components illustrated therein.

Among other components not shown, the computing system 200 generally includes an intermediate representation generator 208, a code analyzer 210, and a viewer 212 which may communicate via a network. The network may include, without limitation, one or more local area networks (LANs) and/or wide area networks (WANs). Such networking environments are commonplace in offices, enterprise-wide computer networks, intranets and the Internet. Accordingly, the network is not further described herein.

It should be understood that any number of intermediate representation generators, code analyzers, and viewers may be employed in the computing system 200 within the scope of embodiments of the present invention. Each may comprise a single device/interface or multiple devices/interfaces cooperating in a distributed environment. For instance, the code analyzer 210 may comprise multiple devices arranged in a distributed environment that collectively provide the functionality of the code analyzer 210 described herein. By way of further examples, the intermediate representation generator 208 and the code analyzer 210 can be in communication with a plurality of viewers. Additionally, other components not shown may also be included within the computing system 200.

One or more of the intermediate representation generator 208, the code analyzer 210, and/or the viewer 212 might include or be in association with a storage device (not shown) that is configured to store information associated with program code. In various embodiments, such information may include, without limitation, source code, intermediate representations, errors, error paths, error traces, and/or the like. In embodiments, the storage device is configured to be searchable for one or more of the items stored in association therewith. It will be understood and appreciated by those of ordinary skill in the art that the information stored in association with the storage device may be configurable and may include any information relevant to one or more source codes, intermediate representations, errors, error paths, error traces, and/or the like. The content and volume of such information are not intended to limit the scope of embodiments of the present invention in any way. Further, a storage device may be a single, independent component or may be a plurality of storage devices, for instance a database cluster, portions of which may reside on the intermediate representation generator 208, the code analyzer 210, and/or the viewer 212, another external computing device (not shown), and/or any combination thereof.

The intermediate representation generator 208, the code analyzer 210, and/or the viewer 212 shown in FIG. 2 may be or associated with any type of computing device, such as, for example, computing device 100 described above with reference to FIG. 1. By way of example only and not limitation, the intermediate representation generator 208, the code analyzer 210, and/or the viewer 212 may be or associated with a personal computer, desktop computer, laptop computer, handheld device, mobile handset, consumer electronic device, or the like. Alternatively or additionally, the intermediate representation generator 208, the code analyzer 210, and/or the viewer 212 may be or associated with a server. Such a server may include any type of application server, database server, or file server configurable to perform the methods described herein. In addition, a server may be a dedicated or shared server. One example, without limitation, of a server that is configurable to operate as the server is a structured query language ("SQL") server executing server software such as SQL Server 2005, which was developed by the Microsoft® Corporation headquartered in Redmond, Wash.

It will be understood by those of ordinary skill in the art that computing system 200 is merely exemplary. While the intermediate representation generator 208, code analyzer 210, and/or the viewer 212 are each illustrated as a single unit, one skilled in the art will appreciate that such components are scalable. For example, the computing system 200 may include a plurality of viewers 212, and the code analyzer 210 may in actuality include a plurality of servers in communication with one another, or a portion thereof. The single unit depictions are meant for clarity, not to limit the scope of embodiments in any form.

The intermediate representation generator 208, code analyzer 210, and/or the viewer 212 can include a user input module and a presentation module. In some embodiments, one or both of the modules may be implemented as stand-alone applications. In other embodiments, one or both of the modules may be integrated directly into the infrastructure of the intermediate representation generator 208, the code analyzer 210, and/or the viewer 212.

A user input module is configured for receiving input. Such input might include, for example, an indication to view an alternative error path. Typically, input is input via a user interface (not shown) associated with a computing device. Upon receiving input, the presentation module of the computing device is configured for presenting content, for example, an alternative error path or integrated source code. Embodiments are not intended to be limited to visual display but rather may also include audio presentation, combined audio/video presentation, and the like.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 2, the computing system 200 includes the intermediate representation generator 208, the code analyzer 210, and/or the viewer 212. The intermediate representation generator 208 is configured to generate intermediate representations of source code, such as source code 202, source code 204, and source code 206, or portions thereof. As previously discussed, an intermediate representation (IR) refers to an intermediate representation of the program source code. Accordingly, source code can be translated into a form of IR and, such an IR, can in some cases be converted into machine code. In embodiments, an intermediate representation can be a tree, flow chart, or other representation of source code. By way of example, and not limitation, MSIL is common intermediate language used for .NET code. As can be appreciated, source code from which one or more IRs is generated can be any type of source code including, but not limited to, C++, C#, etc. The intermediate representation generator 208 may generate an IR in association with an entire source code or a portion of source code (e.g., a particular function, a set of functions, a portion of a function, etc.). In embodiments, the intermediate representation generator 208 can communicate IR and/or corresponding source code to the code analyzer 210, the viewer 212, or a combination thereof.

The code analyzer 210 is configured to analyze program code, such as source code and/or IR in association therewith. In embodiments, the code analyzer 210 analyzes program code, such as source code and/or IR, provided by the intermediate representation generator 208, another external computing device, and/or a user.

In embodiments, the code analyzer 210 analyzes the source code and/or IR to detect errors in the source code and/or IR. The code analyzer 210 can identify one or more traces or paths, such as error traces or error paths, from a beginning point (e.g., beginning of a function or a conditional statement) to an ending point (e.g., an error). In some cases, the code analyzer 210 might identify all available paths from a beginning point to an ending point (e.g., error). Alternatively, the code analyzer 210 might identify a predetermined number of paths or paths meeting or exceeding a predetermined requirement(s) (e.g., shortest path(s), etc.). In addition to identifying one or more error or errors within program code, or a portion thereof, the code analyzer 210 might generate an error identifier that identifies any number of various attributes of an error. For example, an error identifier might include an indication of a type of error, a location of the error, etc. The code analyzer 210 may communicate one or more error traces, one or more error paths, one or more error identifiers, source code, IR, or a combination thereof to the viewer 212.

Generally, the viewer 212 displays program code, such as source code or IR, to facilitate effective presentation of results of static analysis. The viewer 212 enables a user to view code and, in many cases, to navigate from one section of code to another section of code (e.g., basic blocks, blocks, instructions, entry of called function if the current instruction is a call, etc.). For instance, displayed code, such as an error path, can be navigated in a single-step manner both backwards and forwards (e.g., by line number, by section such as basic block, etc.). Such navigation can occur while also displaying an analysis simulation state and a (simulated) callstack. In some cases, the viewer 212 displays error paths which span multiple lines.

The viewer window can include multiple sub-windows, such as, for example, a code window, a simulation state window, a call stack window, and/or a summary window. A code window displays code, such as source code being analyzed, and may display a highlighted portion that indicates a possible an error in the code or shows the line/instruction and/or a bold portion that shows a simulation path. A simulation state window may include a state of variables used in the program, a state of simulation, an area of execution (e.g., show that a current point of simulated execution is in a critical section, try block, or kernel mode), or the like. A call stack may include a set of instructions, such as the code or current line(s) of code being analyzed, a function(s) being called, etc. At each point, a callstack may include all currently explored functions (i.e., the ones entered and not exited yet) in reverse order of the calls made. A summary window may include a summary of an error(s) being displayed or detected within the code. The summary window may include the error message and all interesting points ("bookmarks") in the path.

In embodiments, the viewer 212 includes an interactive tool 214 and/or a disassembly integration tool 216. The viewer 212, the interactive tool 214, and/or the disassembly integration tool 216 are configured to reference source code, IRs in association with source code files, error traces, error paths, error identifiers, and/or the like. Such source code, IR, error traces, error paths, and/or error identifiers can be referenced by receiving, retrieving, determining, or identifying the items. By way of example only, IRs can be received from the intermediate representation generator 208, while error traces or error paths, or indications thereof, and error identifiers can be received from the code analyzer 210.

In some cases, the viewer 212, or a component thereof, can receive one or more error traces or error paths to display, for example, via the code analyzer 210. For example, in some embodiments, the viewer 212 receives IR and one or more error traces in association therewith. Such an IR and a particular error trace can be received and used to select and/or display a particular error path (e.g., a path having a shortest length) of the error trace.

Alternatively, the viewer 212, or a component thereof, can generate or identify error paths of source code to be displayed based on, for example, an intermediate representation in association with the source code and error identifiers (e.g., a location of the error, such as IR or source code line number, and error type), an indication of an error path(s) (i.e., an error path indicator), an indication of an error trace(s) (i.e., an error trace indicator), or the like, provided by the code analyzer 210. In this regard, the viewer 212 might receive IR corresponding with an error as well as information regarding the position of the error to generate or determine one or more error paths in association with the particular error within corresponding source code. In another example, the viewer 212 might receive IR corresponding with an error as well as an error path indicator that indicates, for example, locations, boundaries, or sections of code defining an error path. In such a case, the viewer 212 can utilize the IR and error path indicator to generate or determine one or more error paths within source code that are associated with the particular error. As can be appreciated, an error path indicator can indicate an error path within IR and/or source code.

The interactive tool 214 is configured to facilitate providing alternative error paths to a user via a user interface. Initially, an error path including an error is displayed to a user, for example, via a viewer. In some cases, an error path is displayed upon an occurrence of an event, such as opening the viewer, selecting the interactive tool indicator via the user interface, selecting an error identifier associated with an error path. As previously discussed, an error identifier identifies an error within code and can include an indication of an error type, an indication of an error location, etc. By way of example only, upon selecting to view a source code, or errors in association therewith, the viewer 212 can present to the user a list or table of errors (i.e., error identifiers) that have been detected in association with the code. The user can then select one of the errors, or identifiers thereof, to view an error path in association with the error. An initial error path to be displayed to a user can be selected, for example, by the viewer 212 or the code analyzer 210. For instance, assume that multiple error paths of an error trace contain a particular error selected by a user. In such a case, the error path having a shortest route length or path to the error might be selected from among a set of error paths to be initially displayed to the user.

Display of an error path enables a user to view and analyze the error path in an effort to recognize and/or fix an error in the code. Upon viewing an error path, if the user wishes to view an alternative error path, such as an error path not previously or presently displayed, the user can provide such a selection. That is, the user can select to view another path within program code that includes the error. In this regard, a user might select to avoid or disregard a particular portion of an error path (i.e., an edge of a graph/path) and, thereafter, another error path can be identified and/or selected for display to the user.

An indication to view an alternative path can be provided in any manner. For example, a user can select a portion of displayed source code, such as the path/edge that is preferred to be avoided, and select an alternative path indicator that indicates a desire to view an alternative error path. In such a case, the portion of displayed source code preferred to be avoided is considered infeasible. Accordingly, the designated edge can be removed from an internal trace graph and an alternative error path (e.g., next shortest path) can be generated, selected and/or displayed, if available. An alternative path indicator can be any button, icon, or command (e.g., Shift-K, a button indicating to suppress or ignore an error). In an alternative embodiment, a user may simply select an alternative path indicator, and an alternative error path that is different from the error path currently being displayed, if available, is thereby generated, selected, and/or displayed. Alternative error paths can be selected based on, for example, the next shortest error path from the beginning point to the error, etc. Alternative error paths may be generated, identified, and/or selected by the code analyzer 210, the viewer 212, or another component.

By way of example only, assume that a single function having an error exists. In such a case, the viewer 212 displays an error path that includes at least the error, such as, for example, the shortest path that begins at a beginning point (e.g., the beginning of the function) and ends at the error. Further assume that the error path presented to the user includes an error that is unreachable, inapplicable, inappropriate, or infeasible (e.g., "end process" is not recognized, but the user knows that the process would not continue). Accordingly, the user can select to ignore, dismiss, or suppress the error and thereby view an alternative error path including the same error. Allowing for such interactive software enables a user to identify that an error is an actual error or bug that requires acknowledgment, attention, etc. In embodiments, the various alternative error paths are recognized at the code analyzer 210 and selected for presentation at the viewer 212.

In some embodiments, a user can continuously toggle between alternative error paths. In other embodiments, a user can continue viewing alternative error paths until each error path has been displayed. In this regard, an alternative error path can be displayed, upon request, as long as a unique error path in an error trace or graph exists, that is, for example, not all portions of the paths within a graph have been avoided. In instances that no more alternative error paths exist, the viewer might indicate (e.g., gray out or highlight) the corresponding error identifier as refuted in the list of error identifiers. Such an interactive tool 214 assists in preventing a user from wrongly or mistakenly dismissing or refuting an error as infeasible or invalid because a single, incomprehensive error path was displayed and analyzed.

The disassembly integration tool 216 is configured to integrate source code with corresponding intermediate representation. In this regard, the disassembly integration tool 216 displays low-level code to the user. Such an integration or interleaving of source code and IR enables a user that is unfamiliar with a particular code and/or macros to more efficiently and effectively identify the functionality and/or errors within the code. The IR is generally complete in that compiler-generated code or transformations are explicit, such as implicit coercions, and complex constructions/expressions are broken down to simpler primitives. In embodiments, IR, although low-level, generally retains higher-level features such as virtual calls and is thus not as low level as, for example, machine code.

By way of example, a user might be unable to recognize source code, or a portion thereof, when a compiler performs significant transformations (e.g., C# iterators or C++ destructors) or when the source code includes macros (e.g., most commercial C/C++). The IR provides an alternative manner to present traces or paths (e.g., error traces or error paths) of source code and enables comprehension and understandability of obscure code. Interleaving source code and IR allows the correlation between the IR and the source code to be more apparent. The disassembly integration tool might be initiated by a user selecting to enter the integration mode, such as, for example, via a disassembly integration tool indicator such as a button, an icon, or other mechanism that, if selected, provides an indication to interleave source code with corresponding IR.

Accordingly, the disassembly integration tool 216 can reference source code and/or IR, for example, received from the intermediate representation generator 208, the code analyzer 210, another computing device, a user, etc. In embodiments, the disassembly integration tool 216 identifies portions or sections of source code that correspond with portions or sections of IR. Such a correspondence can be recognized, at least in part, utilizing line numbers associated with the source code and/or the IR. The source code and/or IR can be divided into sections such that complex expressions are simplified and code is displayed in sections at a smaller granularity level for ease of analyzing the code. A section might be, for example, a function, a statement, a control flow graph, an instruction, or the like.

The source code can then be interleaved with the IR on a section-by-section basis such that source code sections are nearby corresponding IR. In some embodiments, the disassembly integration tool 216 enables a user to navigate the integrated code, for example, at the IR level, the source code level, or a combination thereof.

By way of example only, source code includes a collection of functions in text format. A function is a list of statements. The corresponding IR is a collection of control flow graphs (CFGs), one CFG per function. A CFG is a graph of instructions and directed edges from each instruction to the next instruction(s) to execute. Edges going out of branch instructions can have conditions in association therewith. The IR instructions may be associated with the source code by source information (e.g., file name and line number) for each instruction. The viewer may display a list of pairs (source line, all instructions with the same source information) for the current function on the screen, in the usual line order of the source. In embodiments, the IR is only shown for instructions of the current function. If the user chooses to navigate forward from a call instruction, the viewer will jump to the called function IR, where its (line, IR with same info) list will be shown, but not the previous function's IR or any other function IR. Alternatively, all IR of the currently shown file can be interleaved. In instances that C# is utilized, C# includes a construct called anonymous delegate, which allows an (anonymous) function to be defined within another function. In such a case, the viewer can behave as described above, i.e. the IR of the anonymous function will be shown only if navigated forward from the actual call of this function, but not in the function where the anonymous function was defined. In some cases, source code is not available (for compiler generated functions, for example). In such cases, the IR might be displayed, while in a normal mode portions that do not have source code are stepped over so that a user navigating the source code may only view a subset of the path.

Figure 3:
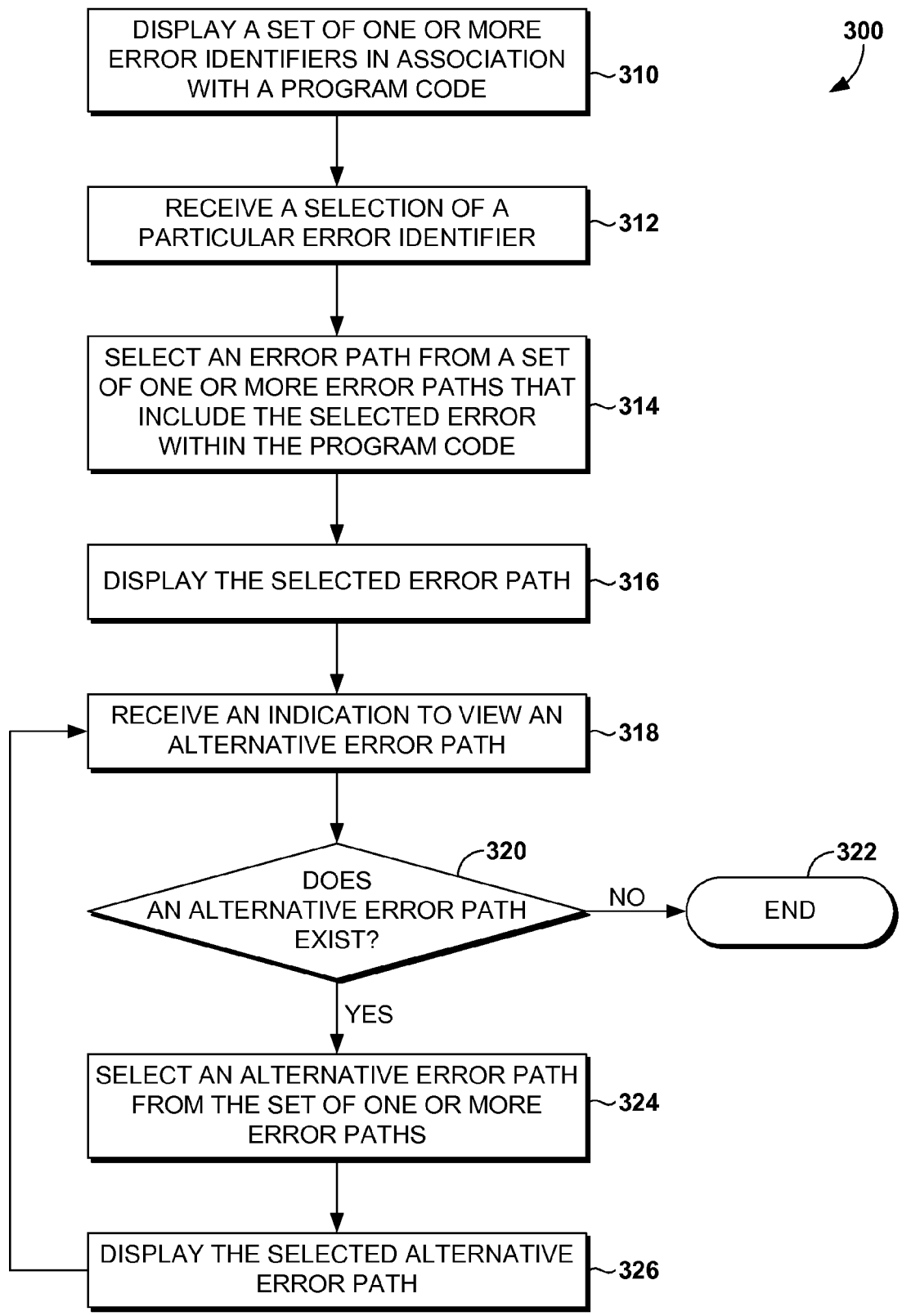
FIG. 3 is a flow diagram showing a method for facilitating static software program analysis that presents alternative error paths to users, in accordance with an embodiment of the present invention.

Turning now to FIG. 3, a flow diagram is illustrated which shows a method 300 for facilitating static software program analysis that presents alternative error paths to users, in accordance with an embodiment of the present invention. Initially, at block 310, a set of one or more error identifiers identifying an error(s) within a program code (e.g., source code or an intermediate representation) is displayed. Subsequently, at block 312, a particular error identifier in association with the program code is selected, for example, via a user. At block 314, an error path is selected from a set of one or more error paths that include the error within the program code in association with the selected error identifier. In some embodiments, an error trace having the set of one or more error paths is identified by a code analyzer, such as code analyzer 210. In this regard, upon identifying or detecting an error or defect within program code, error paths that have a beginning point (e.g., beginning of a function) and an ending point (e.g., a particular defect) are identified. In such embodiments, the code analyzer 210 provides the viewer 212 with the various error paths.

At block 316, the selected error path is displayed to the user. Thereafter, an indication or selection to navigate to or view an alternative error path is received or recognized. This is indicated at block 318. For instance, a user might determine that the presented error path is infeasible and, therefore, wish to view any other error paths that exist for the particular error. At block 320, it is determined if an alternative error path in association with the selected error identifier exists. In some cases, an alternative error path is an error that is not currently being displayed. In other cases, an alternative error path is an error path that is not currently displayed or previously displayed. If it is determined that an alternative error path does not exist, the method ends at block 322. In such a case, a notification can be presented to the user to notify the user that no further error paths exist for the error corresponding with the selected error identifier. For example, the error identifier presented in the list of errors identifiers can be dismissed or otherwise indicated as confirmed or concluded. If, on the other hand, it is determined that an alternative error path does exist, an alternative error path is selected from the set of one or more error paths for presentation to the user, as indicated at block 324. In some cases, the next shortest error path from the beginning point to the ending point is selected. At block 326, the selected alternative error path is displayed to the user. If the user chooses to view another alternative error path and provides an indication as such, the method returns to block 318.

It will be understood by those of ordinary skill in the art that the order of steps shown in the method 300 of FIG. 3 are not meant to limit the scope of the present invention in any way and, in fact, the steps may occur in a variety of different sequences within embodiments hereof. Any and all such variations, and any combination thereof, are contemplated to be within the scope of embodiments of the present invention.

By way of example only and with reference to FIGS. 4-8, FIGS. 4-8 illustrate exemplary displays of a graphical user interface in association with an interactive tool, such as the interactive tool 214 of FIG. 2, according to embodiments of the present invention. A viewer user can interact with the displayed graphical user interface using well known input components—such as, for example, a mouse, joystick, stylus, touchscreen, keyboard, or the like.

Initially, with reference to FIG. 4, viewer 400 shows a list of error identifiers 402 within a program code, or a portion thereof. For example, the list of error identifiers might identify defects found within a function of source code or IR. Assume that a user selects error identifier 404 to view. In such a case, as shown in FIG. 5, viewer 500 displays at least a portion of an error path 502 having the error in association with the error identifier selected by the user. Accordingly, the user is able to view at least a portion of the program code having the selected error. In some cases, the user might navigate through various lines of the program code, for example, using arrow keys, etc.

Now assume that upon viewing the program code, the user recognizes that the error is infeasible. For example, the user determines that the argument is always greater than two. Accordingly, the user navigates to the program code line having the edge or path in the error path that the user would like to avoid. As illustrated by viewer 600 of FIG. 6, the user navigates to edge 602 of the error path preferred to be avoided (i.e., line 20 of the program code). As the user would like to avoid a particular edge in the error path, the user provides such an indication, such as, for example, entering shift-K or any other command, icon, etc. In such a case, an alternative error path is selected and displayed to the user, as illustrated in viewer 600 of FIG. 7 display, via viewer 700, at least a portion of an alternative error path 702. A user can continue to select to view alternative error paths, for example, by avoiding particular paths, until no further alternative error paths exist for the selected error. Upon displaying the final error path or upon receiving a selection to view an alternative error path when no alternative error paths exist for display, viewer 800 of FIG. 8 highlights the error identifier 802 to indicate the associated error as refuted.

Figure 9:
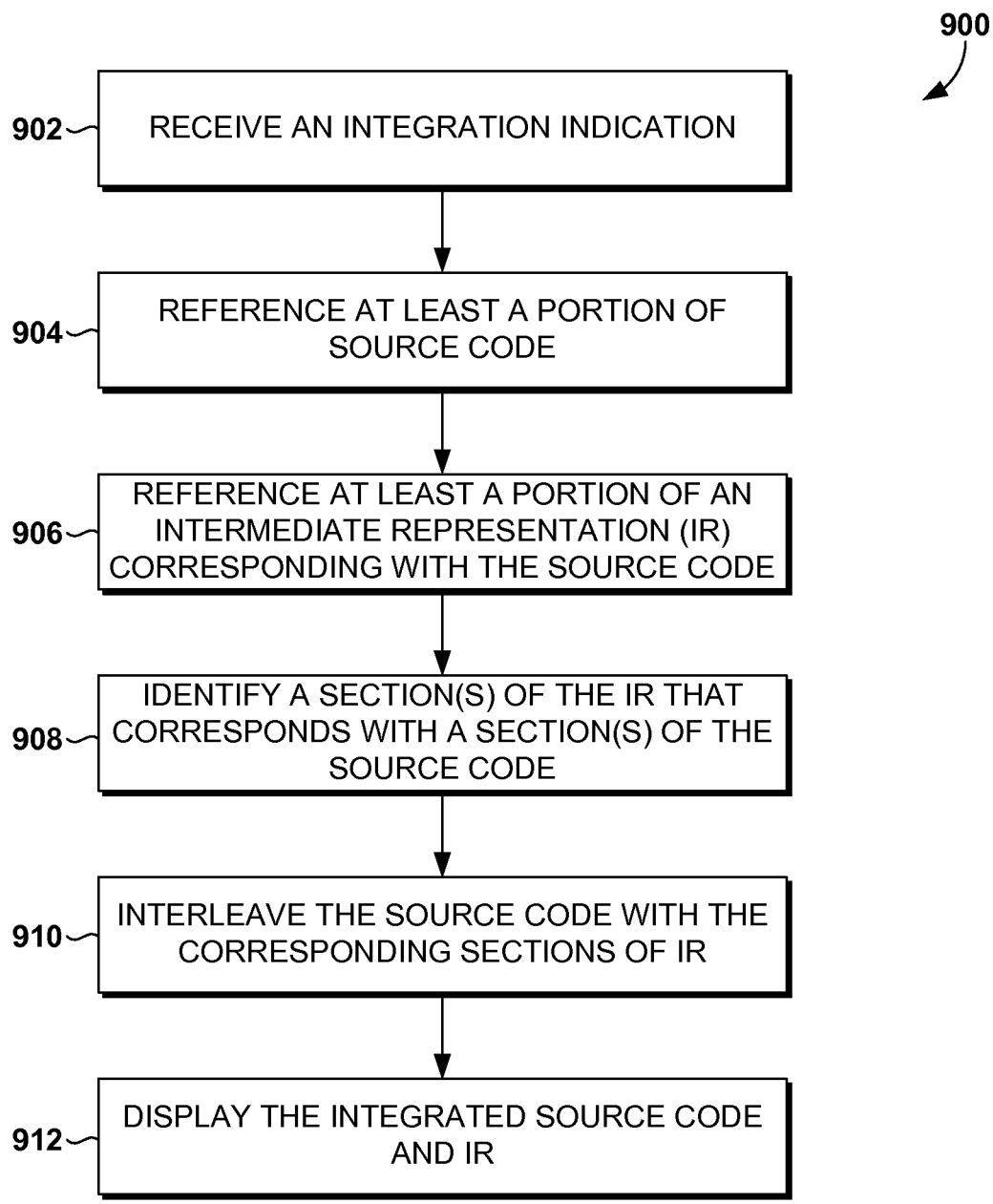
FIG. 9 is a flow diagram showing a method for facilitating static software program analysis that presents source code interleaved with intermediate representations, in accordance with an embodiment of the present invention.

Turning now to FIG. 9, a flow diagram is illustrated which shows a method 900 for facilitating static software program analysis that presents source code interleaved with intermediate representations to users, in accordance with an embodiment of the present invention. Initially, at block 902, an integration indication is received that indicates a user desire to view the source code integrated with corresponding IR. An integration indication might be initiated, for example, by a user selecting a button, icon, or other indicator to indicate a desire to view integrated code. At block 904, at least a portion of source code is referenced. The referenced source code might be all source code for a software program or a portion of the source code for a software program (e.g., source code related to a particular function(s) or source code in association with a particular error(s)). In some embodiments, the source code is provided directly to a viewer, such as viewer 212 of FIG. 2. In other embodiments, the source code is provided to a viewer via an intermediate representation generator, a code analyzer, or any other computing device. Alternatively, an IR of the source code is provided to a viewer, such as viewer 212, which utilizes such information to provide the source code.

At block 906, at least a portion of an intermediate representation corresponding with the source code is referenced. The referenced IR might be all IR for a software program or a portion of the IR for a software program (e.g., IR related to a particular function(s), IR in association with a particular error(s)), IR in association with referenced source code, etc.). In some embodiments, the IR is provided to a viewer, such as viewer 212 of FIG. 2, via an intermediate representation generator, a code analyzer, or any other computing device. In other embodiments, an IR of the source code is generated by a viewer, such as viewer 212.

The section(s) of IR that corresponds with the section(s) of source code is identified, as indicated at block 908. Subsequently, at block 910, the source code section(s) and IR section(s) are interleaved such that IR corresponding with the source code is positioned relative to the source code. At block 912, the integrated or interleaved source code and IR are displayed to the user.

It will be understood by those of ordinary skill in the art that the order of steps shown in the method 900 of FIG. 9 are not meant to limit the scope of the present invention in any way and, in fact, the steps may occur in a variety of different sequences within embodiments hereof. For example, source code and/or IR might be referenced prior to receiving a user indication to view integrated code. Any and all such variations, and any combination thereof, are contemplated to be within the scope of embodiments of the present invention.

By way of example only and with reference to FIGS. 10-11, FIGS. 10-11 illustrate exemplary displays of a graphical user interface in association with a disassembly integration tool, such as disassembly integration tool 216 of FIG. 2, according to embodiments of the present invention. A viewer user can interact with the displayed graphical user interface using well known input components—such as, for example, a mouse, joystick, stylus, touchscreen, keyboard, or the like.

FIG. 10 illustrates a viewer 1000 that displays at least a portion of source code. Upon recognizing an indication to display source code integrated with IR, FIG. 11 illustrates a viewer 1100 that displays at least a portion of source code integrated with corresponding IR. For example, a first portion of source code 1102 is followed by a first portion of corresponding IR 1104, and a second portion of source code 1106 is followed by a second portion of corresponding IR. In this regard, IR that corresponds with a particular section of source code is positioned below the source code. Although FIG. 11 illustrates IR being displayed below the source code, other arrangements are intended to be included within the scope of embodiments of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media having computer-executable instructions embodied thereon, that when executed, cause a computing device to perform a method for facilitating static software program analysis that presents alternative error paths to users, the method comprising:
    from a set of error paths, presenting a first error path comprising a first path of a software program including an error;
    receiving an indication that the first error path is to be avoided;
    in response to the received indication, identifying a second error path of the software program including the error, wherein the second error path is identified from among the set of error paths;
    presenting the second error path comprising a second path of a software program including the error; and
    selecting the second error path from the set of error paths, wherein the first error path and the second error path are different and the second error path is selected based on a length of the second error path relative to a length corresponding with error paths within the set of error paths.

2. The media of claim 1, further comprising receiving a selection of the error for which the first path of the software program is presented.

3. The media of claim 1, wherein a user selects the error for which the first path of the software program is presented by selecting an error identifier displayed in association with the software program.

4. The media of claim 1 further comprising receiving an indication of the error.

5. The media of claim 1 further comprising recognizing one or more error paths within the software program.

6. The media of claim 1, further comprising selecting the first error path from the set of error paths based on a length of the first error path relative to a length corresponding with error paths within the set of error paths.

7. The media of claim 1, wherein the second error path is an error path within the set of error paths that has not been previously or presently displayed.

8. A method for facilitating static software program analysis that presents source code interleaved with intermediate representations, the method comprising:
    referencing at least a portion of source code;
    referencing at least a portion of an intermediate representation in association with the at least the portion of source code;
    identifying a first section of the intermediate representation that corresponds with a first section of the at least the portion of source code;
    interleaving the at least the portion of source code with intermediate representation, wherein the first section of the intermediate representation is positioned relative to the first section of the at least the portion of source code; and
    displaying the at least the portion of source code with the first section of the intermediate representation interleaved within the at least the portion of the source code;
    identifying a second section of the intermediate representation that corresponds with a second section of the at least the portion of source code;
    interleaving the second section of the intermediate representation with the second section of the source code; and
    displaying the at least the portion of source code with the first section and second section of the intermediate representation interleaved with the corresponding first section and second section of source code.

9. The method of claim 8 further comprising receiving an indication to interleave the at least the portion of source code with the at least the portion of the intermediate representation.

10. The method of claim 8, wherein the first section of the at least the portion of source code comprises a statement or an instruction.

11. The method of claim 8, wherein the first section of the intermediate representation is positioned below the first section of the at least the portion of source code.

12. A system for facilitating static software program analysis, the system comprising:
    an interaction tool for displaying one or more alternative error paths of a source code having an error, the one or more alternative error paths being a different error path from a currently presented or previously presented error path, wherein the interaction tool is configured to select the one or more alternative paths from a set of error paths based on a length of each of the one or more alternative paths, and the interaction tool receives an indication to display an alternative error path of the source code having the error; and
    a disassembly integration tool for integrating source code with an intermediate representation of the source code, wherein one or more sections of the source code are interleaved with one or more corresponding sections of the intermediate representation.

13. The media of claim 1 wherein presenting the first or the second error path comprises presenting a path of program source code and further presenting an intermediate representation of the path of program source code.

14. The media of claim 1 further comprising:
    receiving an indication that the second error path is to be avoided;
    in response to the received indication, identifying a third error path of the software program including the error, wherein the third error path is identified from among the set of error paths; and
    presenting the third error path comprising a third path of a software program including the error.

15. The media of claim 3 further comprising:
    determining that each error path, within the set of error paths, has been avoided; and
    based on the determination, presenting an indication that the selected error identifier has been refuted.

* * * * *